(12) United States Patent
Ramamurthy

(10) Patent No.: US 8,208,625 B2
(45) Date of Patent: Jun. 26, 2012

(54) METHOD AND APPARATUS FOR CAPTURING UNENCRYPTED INFORMATION

(75) Inventor: Arjun Ramamurthy, Glendale, CA (US)

(73) Assignee: Time Warner, Inc., New York, NY (US)

( * ) Notice: Subject to any disclaimer, the term of this patent is extended or adjusted under 35 U.S.C. 154(b) by 1514 days.

(21) Appl. No.: 10/797,637

(22) Filed: Mar. 9, 2004

(65) Prior Publication Data

US 2005/0204153 A1 Sep. 15, 2005

(51) Int. Cl.
*G06F 21/00* (2006.01)

(52) U.S. Cl. .......................................... 380/1; 380/210

(58) Field of Classification Search .................. 713/193, 713/189, 191; 380/210, 228, 229, 241, 287, 380/54, 22; 726/27, 28, 29, 30
See application file for complete search history.

(56) References Cited

U.S. PATENT DOCUMENTS

| | | | | |
|---|---|---|---|---|
| 6,052,506 | A | * | 4/2000 | Fukushima et al. .......... 386/213 |
| 7,278,169 | B2 | * | 10/2007 | Newman .......................... 726/32 |
| 2005/0123135 | A1 | * | 6/2005 | Hunt et al. .................... 380/200 |

* cited by examiner

*Primary Examiner* — Gilberto Barron, Jr.
*Assistant Examiner* — Izunna Okeke
(74) *Attorney, Agent, or Firm* — Proskauer Rose LLP

(57) ABSTRACT

Presently disclosed is a method, apparatus and software for capturing decrypted information by receiving such decrypted information in a presentation device and then directing the decrypted information to a computer readable medium.

25 Claims, 13 Drawing Sheets

METHOD AND APPARATUS FOR CAPTURING UNENCRYPTED INFORMATION

SUMMARY

Presently disclosed is a method, apparatus and software for capturing decrypted information by receiving such decrypted information in a presentation device and then directing the decrypted information to a computer readable medium.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
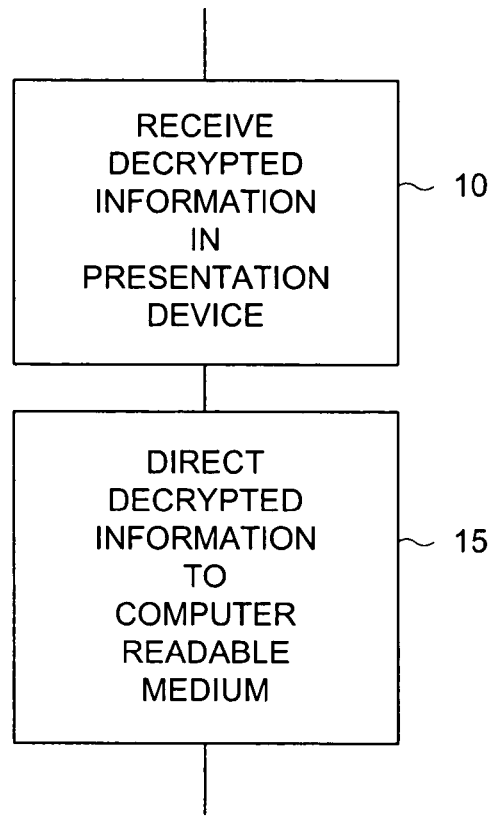
FIG. 1 is a flow diagram that depicts one example method for capturing decrypted information.

FIG. 1 is a flow diagram that depicts one example method for capturing decrypted information. According to this example method, decrypted information is first received in a presentation device (step 10). A presentation device, according to one variation of the present method, includes a device that emulates a presentation device. For example, a device that emulates a presentation device may include a device that appears to an executing computer process as a graphics adapter. Such a device is considered to comprise a device that emulates a graphics adapter. The decrypted information is then directed to computer readable medium (step 15). Examples of such medium include, but are not limited to, random access memory, read-only memory (ROM), compact disk ROM (CD ROM), Digital Versatile Disks (DVD), floppy disks, hard disk drives and magnetic tape. This definition of computer readable medium is applicable throughout this disclosure wherever information is directed to or retrieved from computer readable medium.

The present method may be applied in a situation where encrypted content is received by an authorized content player. In one example use scenario, an authorized content player decrypts the information prior to directing the decrypted information to a presentation device. The presentation device is then able to receive the decrypted information according to the present method. An authorized content player can include, but is not necessary limited to a software program executed on a computer platform. For example, such a software program may be executed in a personal computer or some dedicated computing platform. One example of a dedicated computing platform includes a set-top box used to receive content from a distribution system prior to presentation to a user. Such set-top boxes are often used in cable television systems and direct broadcast satellite television systems.

An authorized content player can interact either directly with a presentation device or through a presentation device driver. An authorized content player or a presentation device driver may seek certification from the presentation device prior to delivering decrypted information to the presentation device. In order to function properly, one alternative method provides that reception of decrypted content is to be accomplished by providing such certification to an executing process (e.g. an authorized content player or a presentation device driver) and then receiving decrypted content from the executing process. According to one variation of the present method, an executing process does not require certification per se, but finds an implied certification by recognizing a certain hardware profile known to be associated with an authorized presentation device. Accordingly, one variation of the present method provide for receiving decrypted content by interaction with an executing process in a pre-defined manner that implies certification as an authorized presentation device. It should be noted that the present method may be utilized in many different applications and the scope of the claims appended hereto is not intended to be limited to any particular application herein described.

Figure 2:
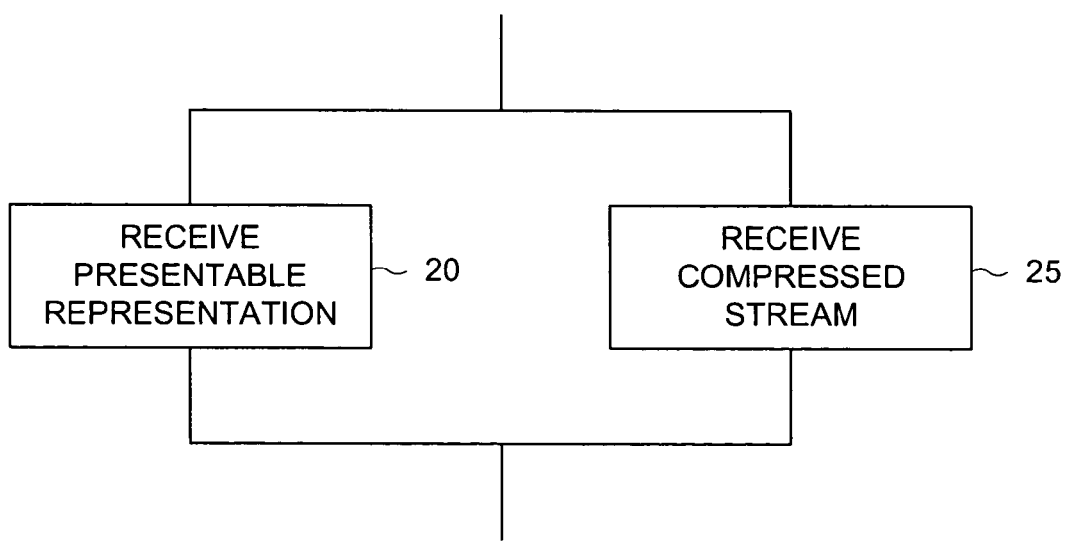
FIG. 2 is a flow diagram that depicts alternative example methods for receiving decrypted information in a presentation device.

FIG. 2 is a flow diagram that depicts alternative example methods for receiving decrypted information in a presentation device. A presentation device can include, but is not necessarily limited to a graphics adapter installed in a personal computer or a graphics coprocessor included in a set-top-box. A presentation device can also include a device that emulates a graphics adapter, according to yet another variation of the present method. According to one example alternative method, decrypted information is received as a presentable representation (step 20). A presentable representation of the decrypted information includes, but is not necessarily limited to display drawing commands in a vector form. According to another variation of the present method, presentable representation of the decrypted information includes, but is not necessarily limited to a cluster of one or more picture elements (pixels). In yet another variation of the present method, the presentable representation comprises a digital sample of audio information. Generally, such presentable representation of the information is used by a presentation device to create some form of signal that can be directed to a display device (e.g. a television monitor or liquid crystal display device) or audio transducer (i.e. a speaker). Some examples of a presentation signal include, but are not necessarily limited to a composite video signal, red-green-blue (RGB) monitor drive signals and digital video interface (DVI) signals used to drive a digital display device (e.g. a liquid crystal display device). According to yet another variation of the present method, the presentation signal comprises an analog audio signal.

According to one alternative example method, the decrypted information is received in a presentation device in a compressed form (step 25), e.g. a compressed content stream. According to yet another alternative example method, a compressed content stream is received in a form that includes at least one of a display frame and an update frame. A display frame is a frame of information that depicts a complete presentation frame. An update frame is a collection of information that may be used to update a previously received display frame. Accordingly, once a display frame is received, it can be amended according to one or more subsequently received update frames.

According to one variation of this method, information is received in a format that is compatible with the Moving Pictures Expert Group (MPEG) video compression standard (e.g. MPEG-I, MPEG-II or MPEG IV). It should be noted that the MPEG standard is constantly evolving and the scope of the appended claims is intended to include all such natural evolutionary revisions of the MPEG video compression standard. The MPEG video compression standard provides for compression of video information through the use of initial frame data. Initial frame data, according to the MPEG standard, comprises an I-Frame. An I-Frame may be updated on a periodic basis using update frames. According to the MPEG standard, an update frame can include a B-Frame and a P-Frame. It should be noted that the present method and any and all variations thereof may be applied in situations were content is received in other forms. Accordingly, the scope of the claims appended hereto is not intended to be limited to any particular compression format (e.g. MPEG) which may be suitable for compressing audio or video content. Accordingly, the scope of the appended claims is to included any content stream that initializes a frame and then subsequently updates the frame.

Figure 3:
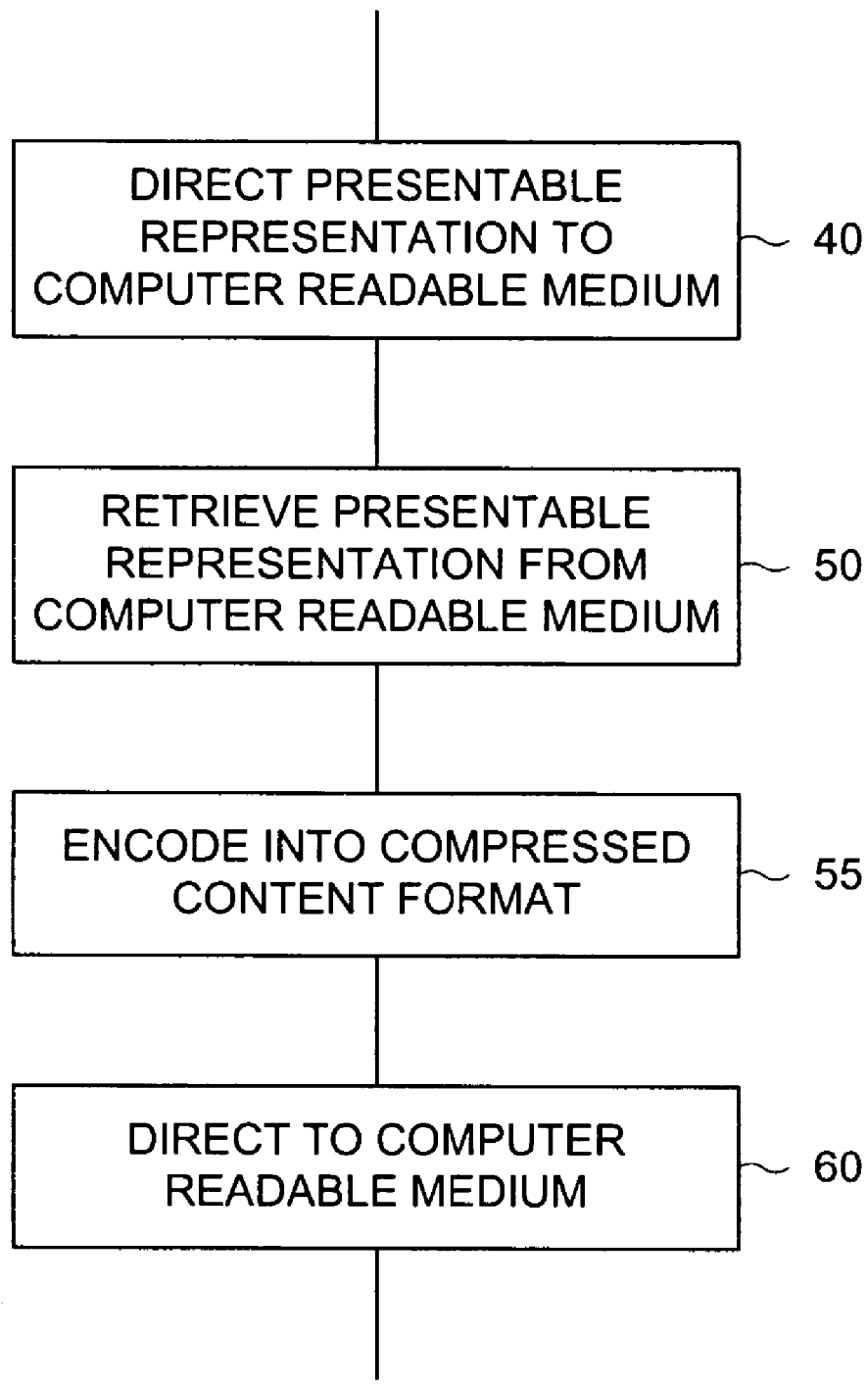
FIG. 3 is a flow diagram that depicts one example alternative method for capturing decrypted information received as a presentable representation of the information.

FIG. 3 is a flow diagram that depicts one example alternative method for capturing decrypted information received as a presentable representation of the information. According to this example method, decrypted information is captured by directing a presentable representation of the information to computer readable medium (step 40). According to another illustrative variation of the present method, the presentable representation of the information is retrieved from computer readable medium (step 50). The presentable representation of the information is encoded to form a compressed content stream (step 55). The compressed content stream is then directed to computer readable medium (step 60). According to one variation of the present method, the content stream comprises at least one of a display frame and an update frame. According to one derivative method, the compressed content stream is encoded in a format compatible with the MPEG video compression standard. According to one illustrative use case, this variation of the present method is implemented as a software program that can be executed after the decrypted information is captured (i.e. off-line). This method, according to one example use case, is applied in a situation where a display adapter in a personal computer creates a presentable representation of information (e.g. in the form of pixel data) and then directs the pixel data to a computer readable medium (e.g. to a file on a hard disk drive). It should be noted that one variation of the present method can be applied where a device that emulates a display adapter is installed in a personal computer. Once the information is captured, the pixel data can be retrieved from the file stored on the hard disk drive and used to form a compressed content stream. The compressed content stream is then directed to another file on the hard disk drive. This example use case is presented as an illustration of one application of the present method and is not intended to limit the scope of the claims appended hereto.

Figure 4:
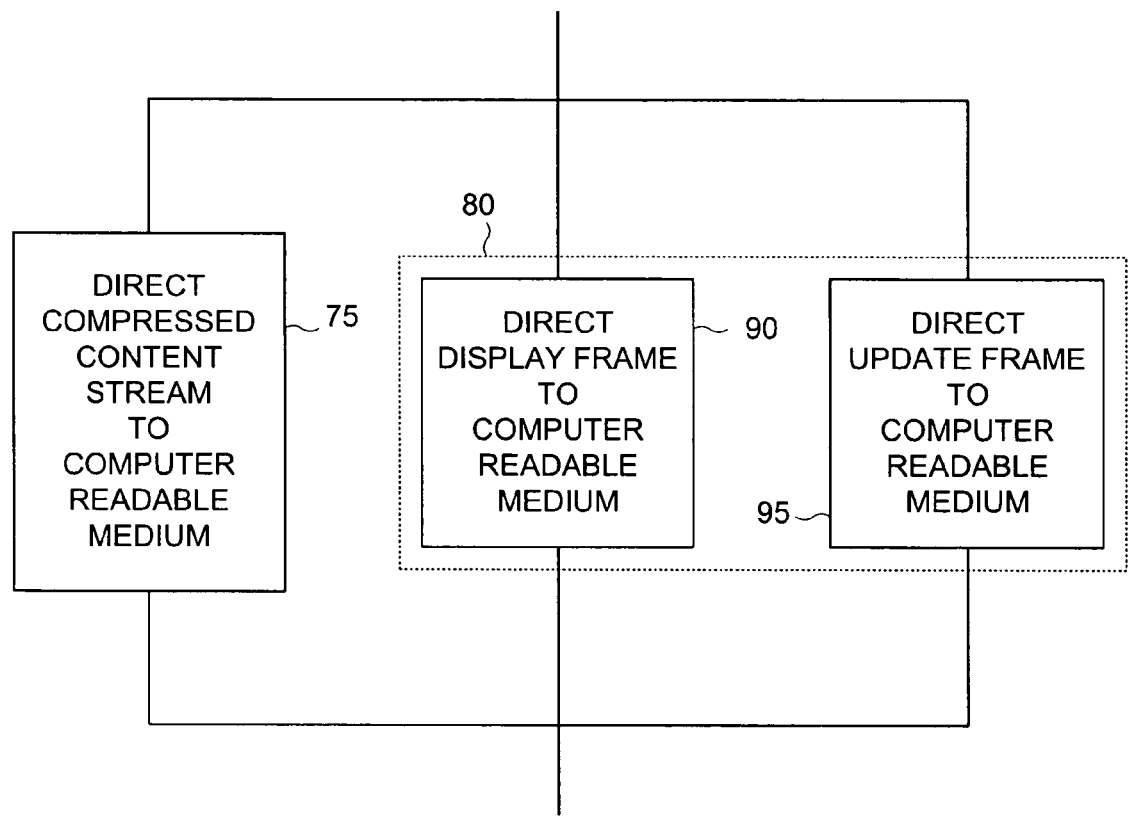
FIG. 4 is a flow diagram that depicts several alternative methods for directing decrypted information to computer readable medium.

FIG. 4 is a flow diagram that depicts several alternative methods for directing decrypted information to computer readable medium. According to one alternative method, a compressed content stream is directed to computer readable medium (step 75). According to yet another alternative method, the compressed content stream is encoded as display frames and update frames (depicted in the figure as reference 80). Accordingly, at least one of a display frame (step 90) and an update frame (step 95) included in the compressed content stream is directed to computer readable medium.

Figure 5:
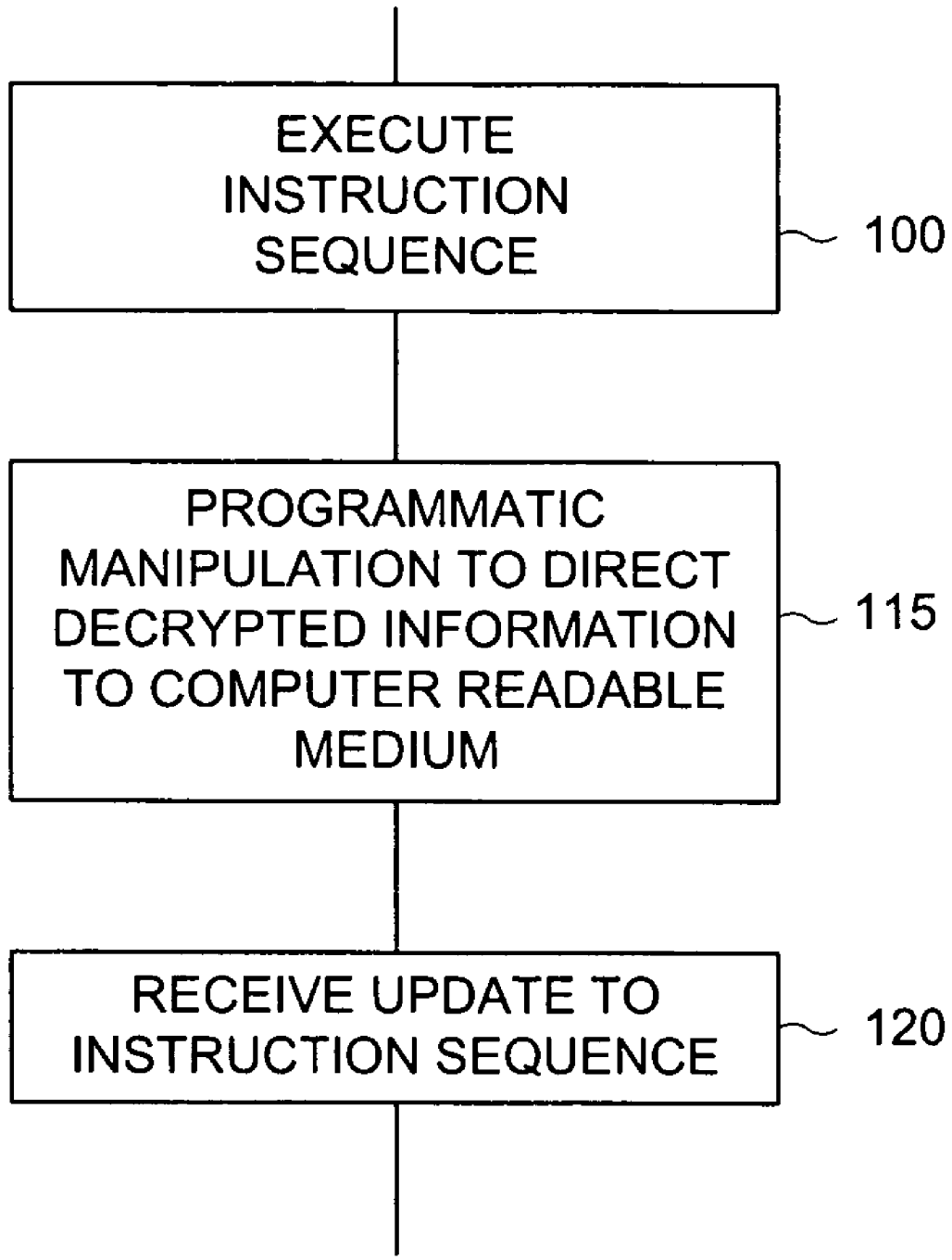
FIG. 5 is a flow diagram that depicts programmatic method for directing decrypted information to computer readable medium.

FIG. 5 is a flow diagram that depicts programmatic method for directing decrypted information to computer readable medium. The present method can be applied in situations where the presentation device (which can include a presentation device emulator) includes an execution unit (e.g. a graphics processor or a digital signal processor) that is controlled by an instruction sequence. According to this illustrative method, an instruction sequence is executed (step 100) in a presentation device (e.g. a graphics adapter in a personal computer). The instruction sequence, when executed by an execution unit in the presentation device, causes the execution unit in the presentation device to direct the decrypted information to computer readable medium (step 115). According to one alternative method, an update to the instruction sequence is received (step 120) and installed in the presentation device. Once the updated instruction sequence is installed in the presentation device, an execution unit included in the presentation device can execute the updated instruction sequence. In some applications of the present method, an execution unit in a presentation device is originally supplied with an instruction sequence that causes the execution unit to receive decrypted information and generate a display signal. According to this alternative method, the originally supplied instruction sequence is either modified or replaced resulting in installation of an updated instruction sequence in the presentation device. The updated instruction sequence then causes the execution unit to direct decrypted content to a computer readable medium according to the present method.

According to one variation of this method, an update to the instruction sequence completely supplants an existing instruction sequence (e.g. an instruction sequence ordinarily supplied with a hardware component such as a display adapter). According to yet another variation of this method, the update to the instruction sequence supplants only a portion of an existing instruction sequence. According to yet another alternative variation of this method, an update to the instruction sequence augments an existing instruction sequence, wherein the existing instruction sequence provides the ability to call upon such a "plug-in" instruction sequences. For example, an execution unit in a hardware component may recognize a trap facility that provides basic addressing for subroutines in an existing instruction sequence. The trap facility can be altered so as to cause the execution unit to call upon a subroutine included in the update that augments the existing instruction sequence. According to one illustrative use case, the present method may be utilized to supplant an instruction sequence known as a "pixel-shader". A pixel-shader is an instruction sequence ordinarily included, for example, in a display adapter capable of converting a compressed content stream into a presentable representation of the content stream, for example in the form of pixels or pixel clusters. In at least one alternative method, the update to the instruction sequence results in a pipelined processing of a content stream. Such pipelined processing results in placing of the content stream as compressed information in a memory. In yet another example method, such pipelined processing results in decoding (i.e. decompressing) of the content stream resulting in a presentable representation thereof stored in a memory.

Figure 6:
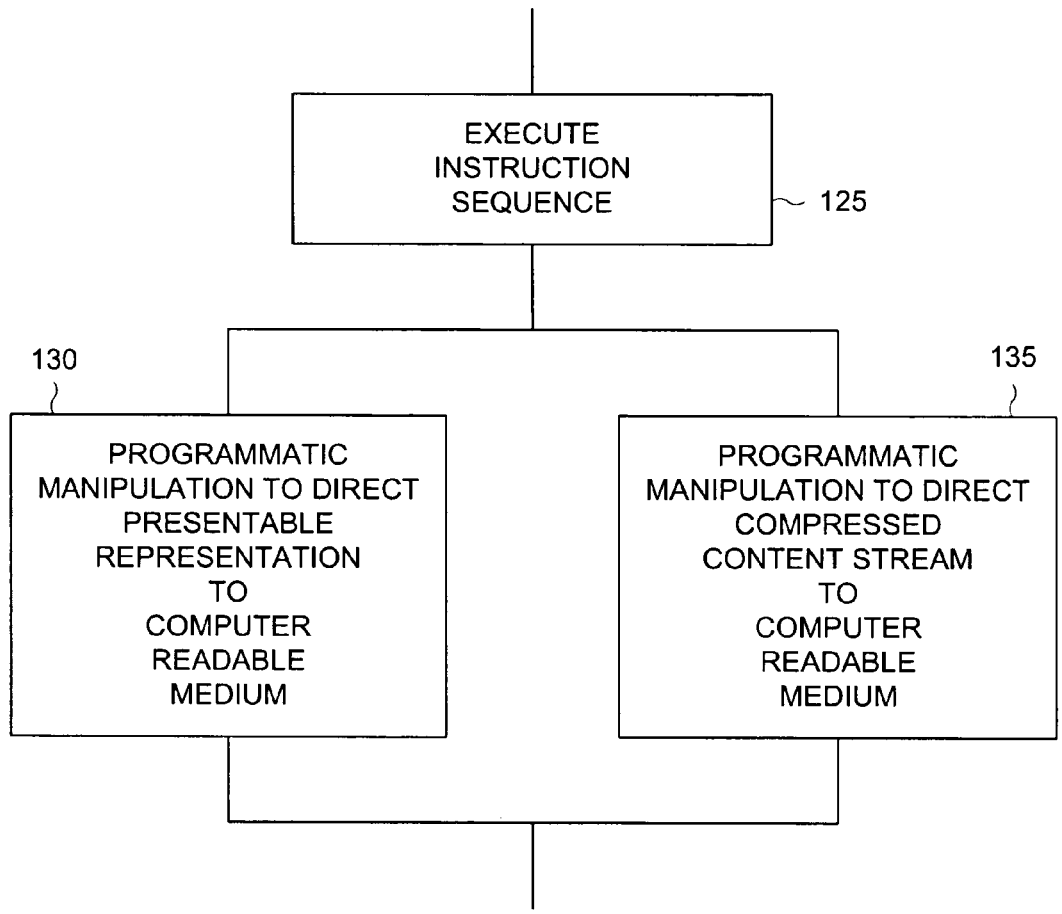
FIG. 6 is a flow diagram that depicts alternative illustrative methods for directing decrypted information to computer readable medium in a programmatic manner.

FIG. 6 is a flow diagram that depicts alternative illustrative methods for directing decrypted information to computer readable medium in a programmatic manner. According to one alternative method, an instruction sequence is executed (step 125). According to one variation of the present method, the decrypted information is received in the form of a presentable representation. In this variation of the present method, the instruction sequence, when executed by an execution unit, causes the execution unit to direct the presentable representation to computer readable medium (step 130). According to another variation of the present method, the decrypted information is received in the form of a compressed content stream. In this variation of the present method, the instruction sequence, when executed by an execution unit, causes the execution unit to direct the compressed content stream to computer readable medium (step 135).

Figure 7:
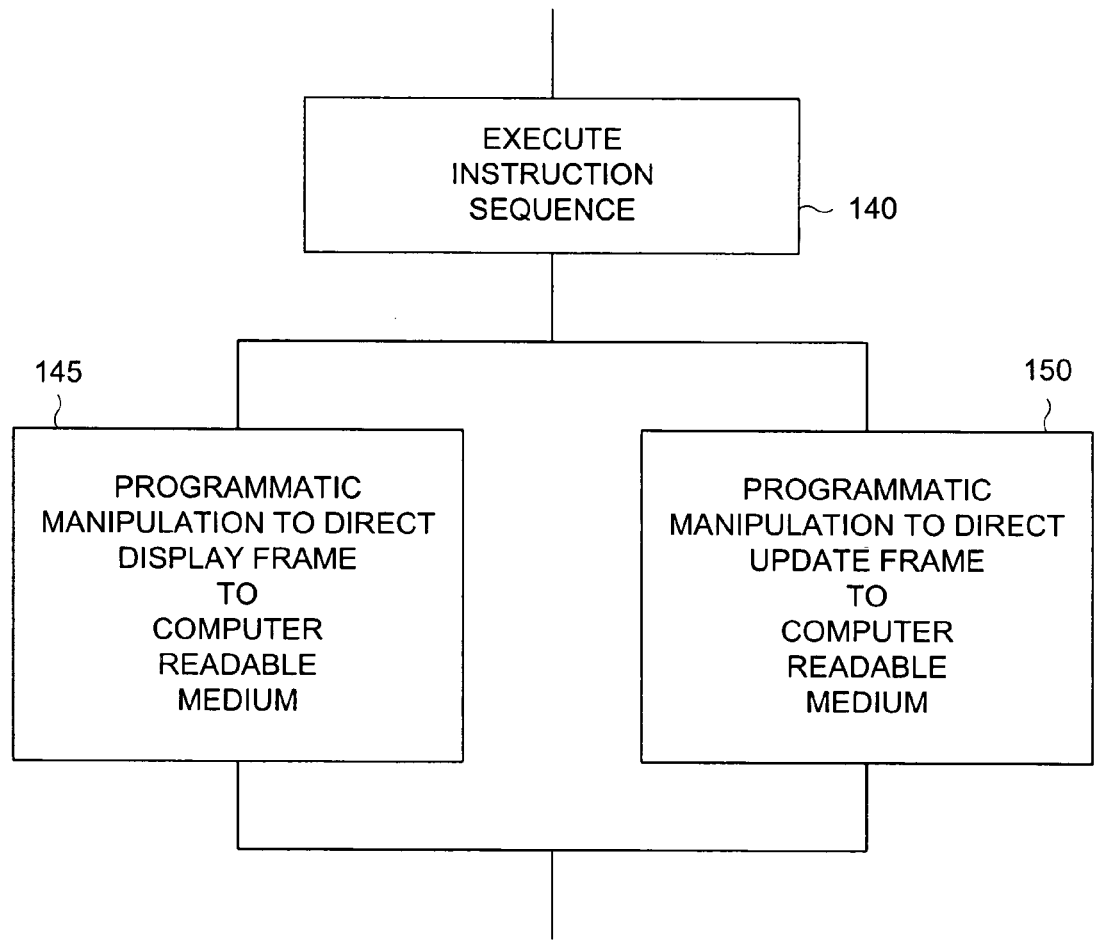
FIG. 7 is a flow diagram that depicts one example method for directing a compressed content stream to computer readable medium through execution of an instruction sequence.

FIG. 7 is a flow diagram that depicts one example method for directing a compressed content stream to computer readable medium through execution of an instruction sequence. According to one alternative method, a content stream includes at least one of a display frame and an update frame. According to this alternative method, an instruction sequence is executed (step 140). According to one variation of the present method, the execution unit directs a display frame to computer readable medium (step 145). According to another variation of the present method, the execution unit directs an update frame to computer readable medium (step 150). According to one example use case, the present method is applied by allowing an execution unit in a hardware component (e.g. a display adapter or a device that emulates a display adapter) to execute an instruction sequence. Typically, the hardware component receives decrypted content from a host system (e.g. a personal computer). The execution unit in the hardware component receives the content stream and executes the instruction sequence in order to direct the content stream back to the host system where it may be recorded on computer readable medium.

Figure 8:
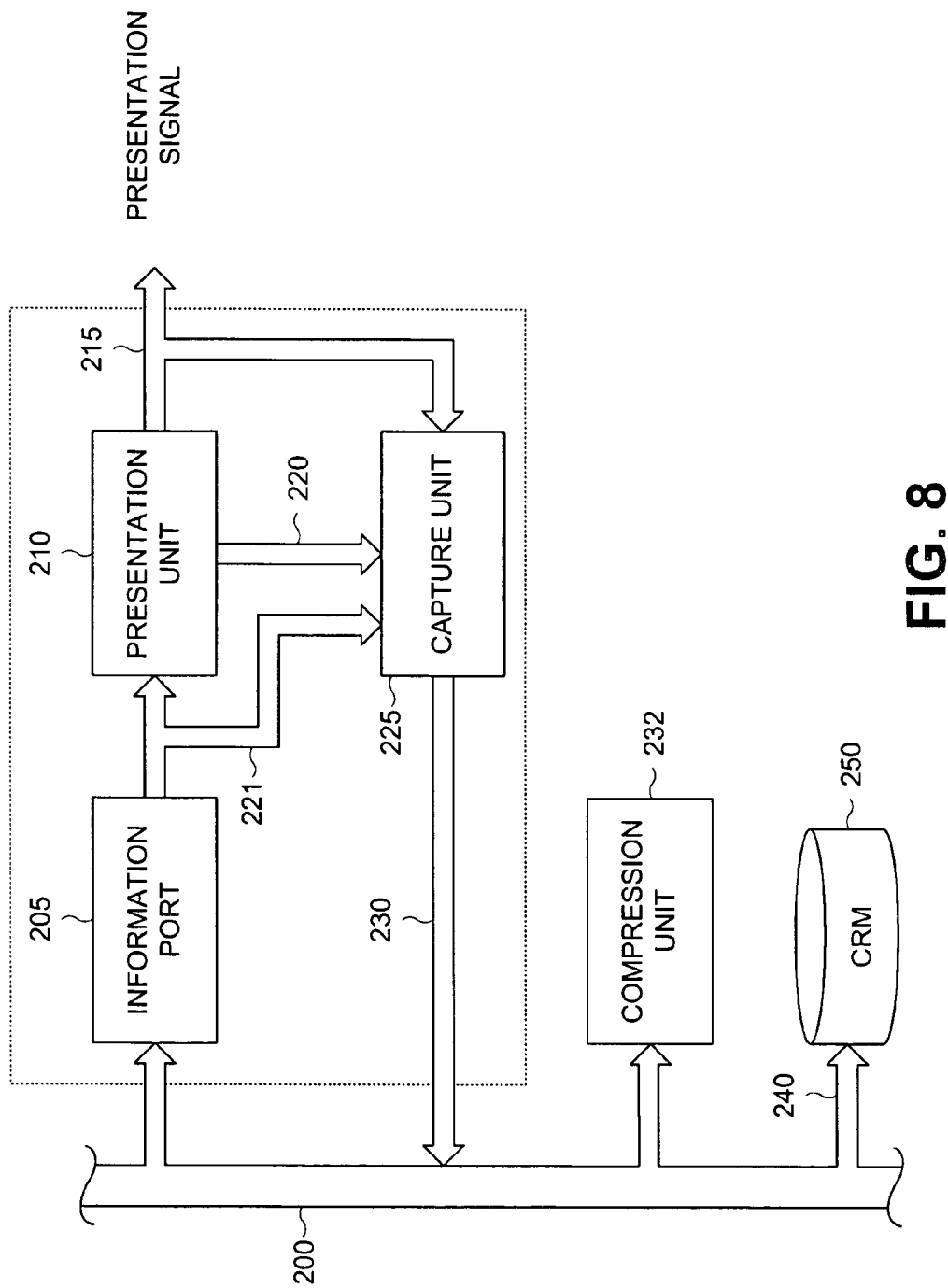
FIG. 8 is a block diagram that depicts one example embodiment of an apparatus for capturing decrypted information.

FIG. 8 is a block diagram that depicts one example embodiment of an apparatus for capturing decrypted information. According to this example embodiment, an apparatus for capturing decrypted information comprises an information port 205 and a capture unit 225. According to one alternative embodiment, an apparatus for capturing encrypted information further comprises a presentation unit 210. According to this example embodiment, decrypted information is received from a system bus 200 when such decrypted information is directed to a presentation device. The information port 205, according to one alternative embodiment, is configured to receive a presentable representation of decrypted content. Accordingly, some external process makes the presentable representation of decrypted content available on the system bus 200. According to another alternative embodiment, the presentable representation of the decrypted content is directed 230 by the capture unit 225 back to the system bus 200. The presentable representation of the decrypted content is then directed 240 to computer readable medium 250.

In an embodiment where the information port 205 is configured to receive a presentable representation of the decrypted content, a presentation unit 210 included in an apparatus for capturing decrypted information converts the presentable representation into a presentation signal 215. The presentation signal 215, according to one alternative embodiment, comprises at least one of a composite video signal, red-green-blue (RGB) monitor drive signals and digital video interface (DVI) signals used to drive a digital display device (e.g. a liquid crystal display device). According to yet another variation of the present method, the presentation signal comprises an analog audio signal. It should be noted that the claims appended hereto are not intended to be limited to any particular type of presentation signal generated by the presentation unit 210.

FIG. 8 further illustrates that one alternative embodiment of an apparatus for capturing decrypted information further comprises a compression unit 232. According to this alternative embodiment, the compression unit 232 retrieves a presentable representation of decrypted content from the computer readable medium 250. The compression unit 232 then encodes the presentable representation into a compressed format, e.g. an MPEG content stream. The compression unit 232 directs 240 the compressed format to the computer readable medium 250.

According to yet another alternative embodiment, the information port 205 included in an apparatus for capturing decrypted information is configured to receive a compressed content stream. According to this alternative embodiment, some external process decrypts information and makes the decrypted information available on the system bus 200 as a compressed content stream. Generally, this external process makes information available on the system bus 200 for the purpose of directing decrypted content to a presentation device. The information port 205 directs 221 the compressed content stream to the capture unit 225. According to one alternative embodiment, the compressed content stream includes at least one of a display frame and an update frame. Accordingly, the capture unit 225 of this alternative embodiment directs 230 at least one of a display frame and an update frame to computer readable medium 250.

According to yet another alternative embodiment, a compressed content stream is directed to the presentation unit 210. The presentation unit 210 generates a presentable representation 220 of decrypted content according to the compressed content stream. The presentable representation 220 is directed to the capture unit 225. The capture unit 225 directs 230 the presentable representation to the system bus 200 from whence it is directed 240 to the computer readable medium 240.

Figure 9:
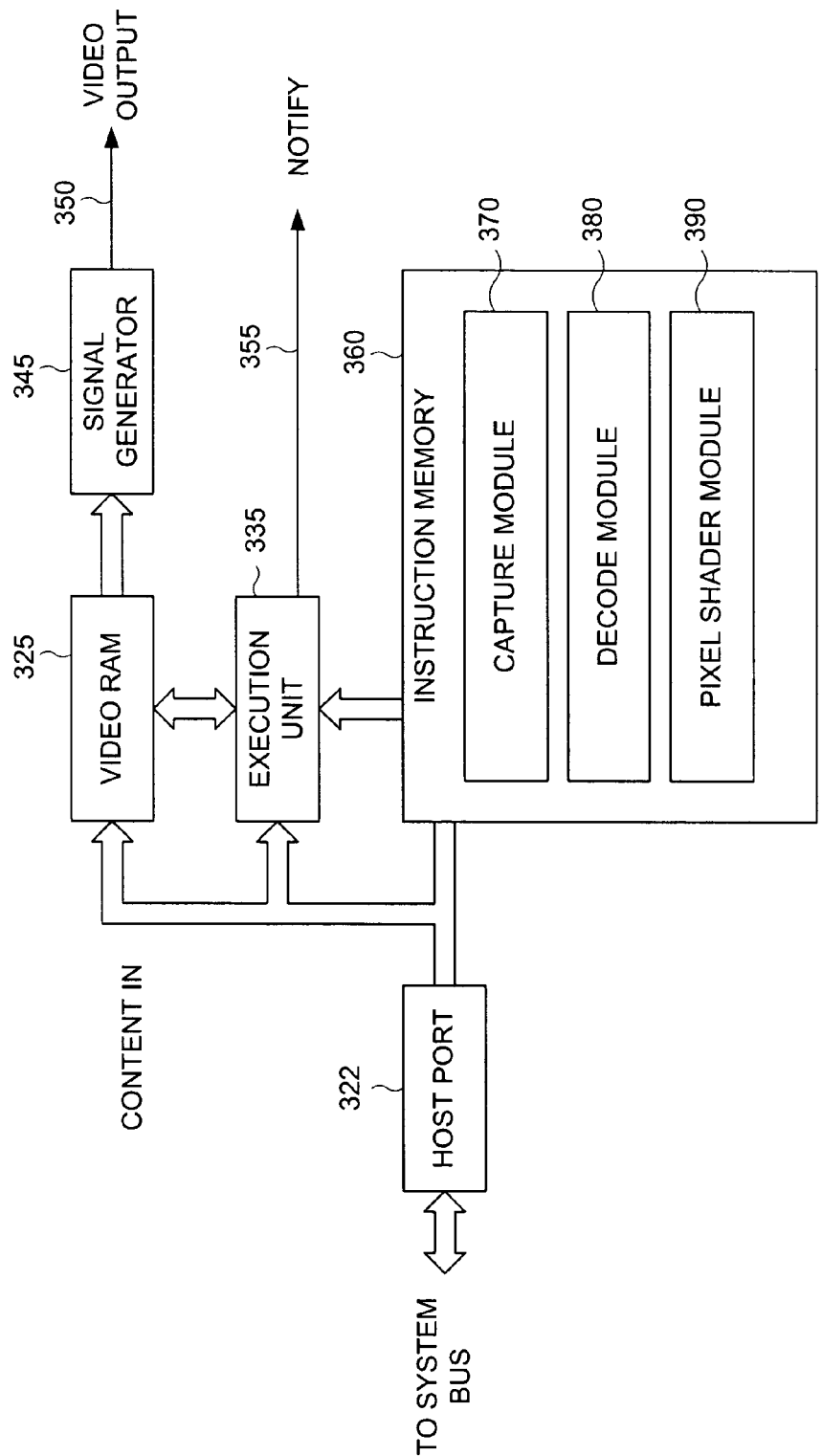
FIG. 9 is a block diagram that depicts one alternative example embodiment of an apparatus for capturing decrypted information.

FIG. 9 is a block diagram that depicts one alternative example embodiment of an apparatus for capturing decrypted information. According to this alternative example embodiment, an apparatus for capturing decrypted information comprises a host port 322, an execution unit 335 and an instruction memory 360. This alterative example embodiment further comprises various functional modules each of which comprises an instruction sequence that can be executed by the execution unit 335. For purposes of this disclosure, a functional module and its corresponding instruction sequence is referred to by a process name. The instruction sequence that implements the process name, according to one alternative embodiment, is stored in the instruction memory 360. The reader is advised that the term "minimally causes the execution unit" and variants thereof is intended to serve as an open-ended enumeration of functions performed by the execution unit as it executes a particular functional process (i.e. instruction sequence). As such, an embodiment where a particular functional process causes the execution unit to perform functions in addition to those defined in the appended claims is to be included in the scope of the claims appended hereto. Further comprising an apparatus for capturing decrypted information is one such functional module called a capture module 370. The capture module 370 is included in the instruction memory 360.

A modern presentation device, for example a display adapter used in a personal computer or any specialized hardware apparatus such as a set-top-box, typically includes some form of an execution unit 335. In the present apparatus, the execution unit 335 can be configured as a specialized coprocessor by one or more functional modules (i.e. instruction sequences) stored in the instruction memory 360. For example, a functional module for decoding a compressed content stream can be stored in the instruction memory 360. Such a functional module is often referred to as a decode module 380. Another example of a functional module that can be used to configure the present apparatus includes a pixel shader sequence, a.k.a. a pixel shader module 390. A pixel shader module 390 configures the execution unit 335 as a pixel shading coprocessor. The present apparatus can be enabled with various types of instruction sequences that are used in conjunction with each other to configure the execution unit as a highly specialized coprocessor. For example, the execution unit 335 can be used to execute a decode module 380 for the purposes of decoding a compressed content stream. Once the compressed content stream is decoded, the execution unit 335 can be made to execute a pixel shader module 390 for the purpose of generating a blended pixel image according to the decompressed content stream. It should be understood that the execution unit 335 in the present apparatus can be configured for any number of specialized purposes and the claims appended hereto are not intended to be limited in scope by any examples described thus far.

According to one example embodiment, the execution unit 335 executes instructions stored in the instruction memory 360. The host port 322, according to one alternative embodiment, enables a system bus to store instruction sequences in the instruction memory 360. The host port 322, according to yet another example embodiment, allows the system bus to communicate decrypted information directly to the execution unit 335. According to yet another example embodiment, the execution unit 335 generates a notification signal (NOTIFY 355) that can be used to notify a host system upon completion of a particular task or process. Typically, the NOTIFY signal 355 is used to interrupt a processor in the host system. Upon such interruption, the processor in the host system executes an interrupt service routine. The interrupt service routine, when executed by the processor in the host system, minimally causes the processor in the host system to service the presentation device in some manner. Again, a presentation device can include a device that emulates a presentation device (e.g. a device that emulates a graphics adapter).

According to yet another alternative embodiment, the host port 322 enables the execution unit 355 to communicate with computer readable medium included in the host system. For example, one alternative embodiment of a host port 322 includes a direct memory access mechanism that enables the execution unit 335 to store and retrieve information from a system memory included in the host system. In yet another alternative embodiment, the direct memory access mechanism enables the execution unit 335 to store and retrieve information from other computer readable medium included in the host system. For example, such other computer readable medium can include, but is not limited to random access memory, read-only memory (ROM), compact disk ROM (CD ROM), Digital Versatile Disks (DVD), floppy disks, hard disk drives and magnetic tape. It is intended that the scope of the claims appended hereto not be limited to any particular example of computer readable medium herein described.

According to one alternative embodiment, an apparatus for capturing decrypted information further comprises a video random access memory (RAM) 325. According to yet another example embodiment, an apparatus for capturing decrypted information further comprises a signal generator 345. According to this alternative embodiment, the execution unit 335 stores a video image (e.g. the form of pixels) in the video RAM 325. When provided, the signal generator 345 generates a video signal 315 according to a video image stored in the video RAM 325. The video signal 350, according to one exemplary embodiment, includes, but is not limited to at least one of a composite video signal, separate drive signals for red-green-blue colors and a digital video interface (DVI) signal capable of driving a digital display device (e.g. a liquid crystal display). It should be noted that the host port 322 in this alternative embodiment enables a host system to access the video RAM 325.

Figure 10:
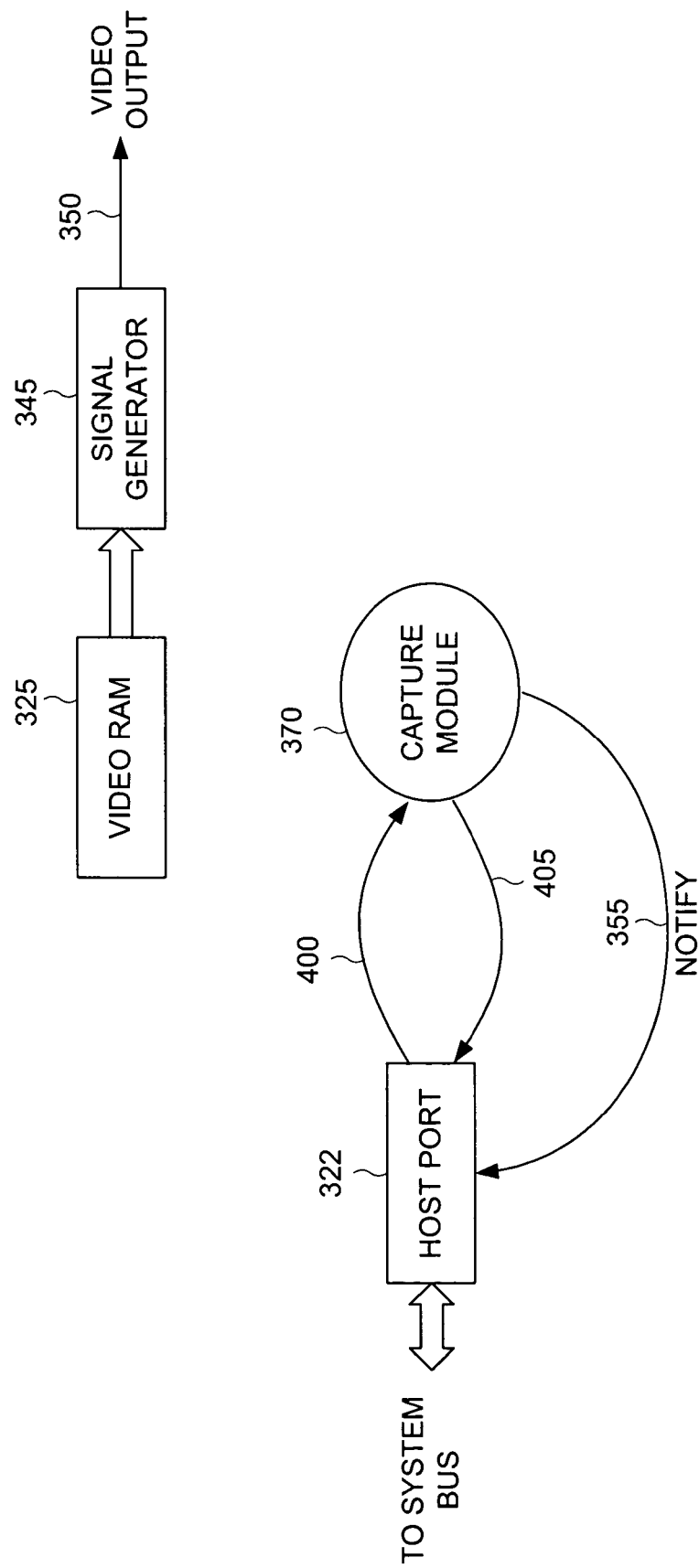
FIG. 10 is a dataflow diagram that depicts the operation of one example embodiment of an apparatus for capturing decrypted information.

FIG. 10 is a dataflow diagram that depicts the operation of one example embodiment of an apparatus for capturing decrypted information. According to this example embodiment, decrypted information is received from a system bus by means of the host port 322. When executed by the execution unit 335, the capture module 370 minimally causes the execution unit 335 to receive 400 decrypted information from the host port 322. In order to receive the decrypted information, the capture module 370, according to one alternative embodiment, minimally causes the execution unit 335 to emulate a presentation device. For example, the capture module 370 of one alternative embodiment minimally causes the execution unit 335 to interact with an authorized content player or a driver module executing on a host computer system. As such, the execution unit 335, as it continues to execute the capture module 370 provides certification information to the authorized content player or to the driver module thereby causing either of these module types to identify the present apparatus as an authentic presentation device.

The decrypted information, according to one of alternative embodiment, comprises a presentable representation of decrypted information. According to this alternative embodiment, the capture module 370, when executed by the execution unit 335, further minimally causes the execution unit 335 to direct 405 the presentable representation of decrypted information to the host port 322. According to one variation of this alternative embodiment, the host port 322 directs the presentable representation of decrypted information to the system bus from whence it may be directed to computer readable medium.

According to yet another alternative embodiment, the decrypted information comprises a compressed content stream. According to this alternative embodiment, the capture module 370, when executed by the execution unit 335, further minimally causes the execution unit 335 to direct 405 the compressed content stream to the host port 322. In a further variation of this alternative embodiment, the compressed content stream includes at least one of a display frame and an update frame. Accordingly, when executed by the execution unit 335, a variation of the capture module 370 minimally causes the execution unit 335 to direct at least one of a display frame and an update frame to the host port 322. The compressed content stream, which according to at least one alternative embodiment comprises at least one of a display frame and an update frame, is directed by the host port 322 to the system bus from whence it may be directed to computer readable medium.

According to one alternative embodiment, decrypted information directed to the system bus needs to be directed to computer readable medium with support from a system processor. In such case, the capture module 370 further minimally causes the execution unit 335 to generate a NOTIFY signal 355. The NOTIFY signal 355 is used to signal a system processor (e.g. by means of an interrupt) that the host port 322 needs to be serviced. Such service typically includes operation by the system processor to retrieve decrypted information from the host port and storage of the decrypted information, e.g. by directing the decrypted information to computer readable medium. It should be noted that, according to this alternative embodiment, the capture module 370 does not cause the execution unit 335 to interact with a video RAM 325. Accordingly, the signal generator 345 does not generate a video signal 350.

Figure 11:
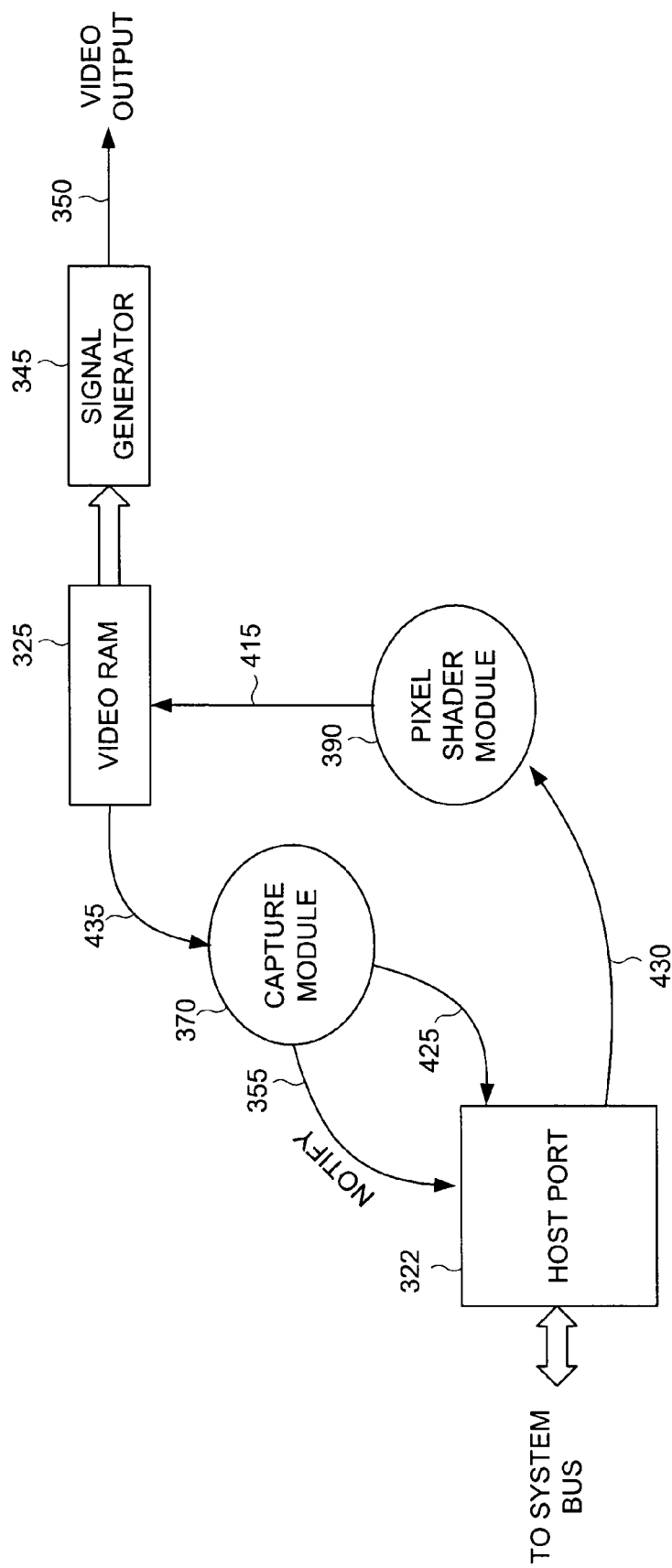
FIG. 11 is a data flow diagram that illustrates one alternative form of operation of an embodiment of an apparatus for capturing decrypted information.

FIG. 11 is a data flow diagram that illustrates one alternative form of operation of an embodiment of an apparatus for capturing decrypted information. According to one alternative embodiment, the execution unit 335 executes the pixel shader module 390. According to this alternative embodiment, the host port 322 receives a presentable representation of decrypted content. As the execution unit 335 executes the pixel shader module 390, it minimally retrieves 430 the presentable information from the host port 322. The pixel shader module 390, when executed by the execution unit 335, further minimally causes the execution unit 335 to generate one or more shaded pixels according to the presentable representation. These are directed 415 into a video RAM 325. The signal generator 345 generates a presentation signal 350 according to the one or more shaded pixels stored in the video RAM 325. According to one alternative embodiment, the execution unit 335 executes the capture module 370. This example embodiment of a capture module 370, when executed by the execution unit 335, minimally causes the execution unit 335 to monitor new writes of shaded pixels into the video RAM 325. When a new pixel or cluster of pixels is written in the video RAM 325, the capture module 370 further minimally causes the execution unit 335 to retrieve 435 the new pixel or cluster of pixels from the video RAM 325 and direct 425 the pixel or pixel cluster to the host port 322. The capture module 370, according to yet another example embodiment, further causes the execution unit 335 to issue a NOTIFY signal 355 when new pixel data needs to be retrieved by a host system from the host port 322.

Figure 12:
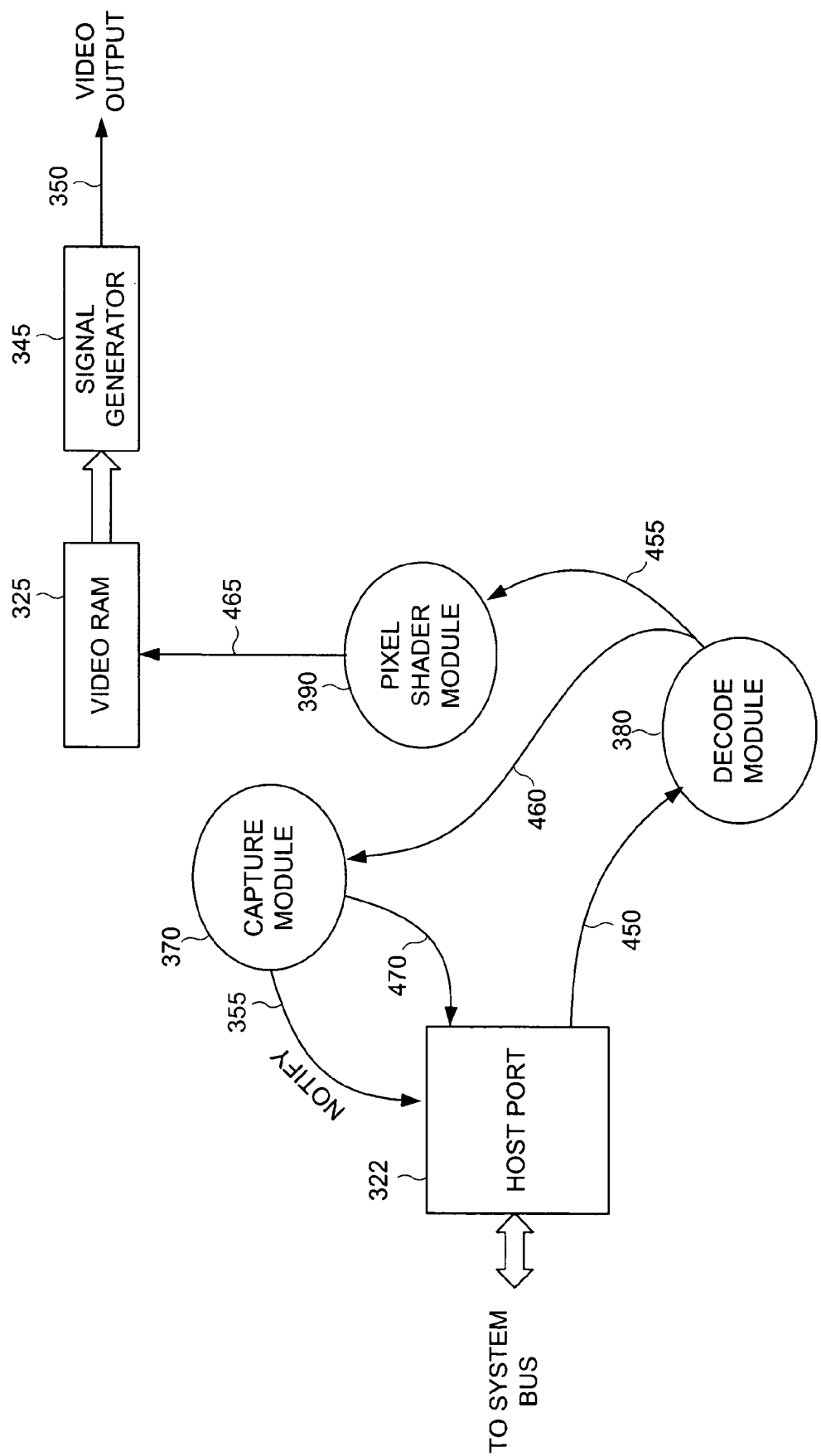
FIG. 12 is a data flow diagram that depicts yet another alternative form of operation of an apparatus for capturing decrypted information.

FIG. 12 is a data flow diagram that depicts yet another alternative form of operation of an apparatus for capturing decrypted information. According to one alternative embodiment, a decode module 380 causes the execution unit 335 to receive decrypted information when it is executed. This alternative embodiment of a decode module 380, when executed by the execution unit 335 minimally causes the execution unit 335 to retrieve 450 decrypted information in the form of a compressed content stream from the host port 322. The compressed content stream, according to yet another alternative embodiment, comprises at least one of a display frame and an update frame. According to yet another alternative embodiment, the decode module 380 further minimally causes the execution unit 335 to interact with an authorized content player or a driver module executed by a host processor so as to cause the authorized content player or the driver module to identify the decode module 380 as an authentic presentation device. Accordingly, decrypted information is directed 460 to the capture module 370 as the capture module 370 is executed by the execution unit 335. The execution unit 335, as it continues to execute the capture module 370 further minimally directs 470 the decrypted information to the host port 322 from whence it may be directed to computer readable medium by way of a system bus. According to one alternative embodiment, the capture module 370 further minimally causes the execution unit 335 to generate a NOTIFY signal 355 that can be used to request data transfer and storage services from a host processor communicatively coupled to the host port 322.

In yet another embodiment, the decode module 380 further minimally causes the execution unit 335 to decode the compressed content stream into a presentable representation (e.g. partially formed pixels). The execution unit 335 further minimally directs 455 the presentable representation to the pixel shader module 390. The pixel shader module, when executed by the execution unit 355, minimally causes the execution unit 335 to generate and store 465 in the video RAM 325 one or more pixels that are used as a basis for a video output 350 generated by the signal generator 345.

Figure 13:
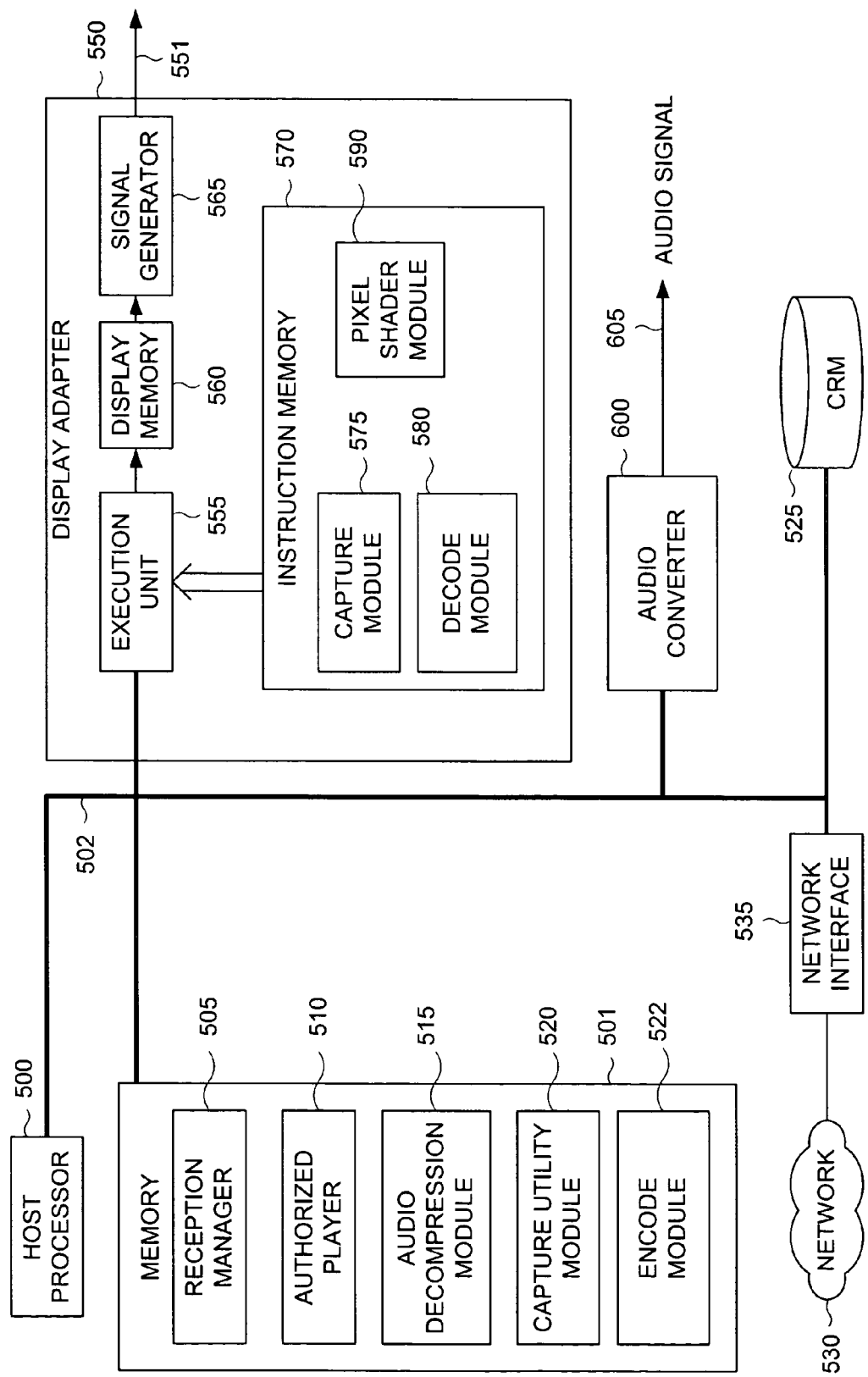
FIG. 13 is a block diagram that depicts one illustrative embodiment of a system for capturing decrypted information.

FIG. 13 is a block diagram that depicts one illustrative embodiment of a system for capturing decrypted information. According to this illustrative embodiment, a system for capturing decrypted information comprises one or more processors 500 and a memory 501. The system for capturing decrypted information further comprises a display adapter 550 that includes an execution unit 555 controlled by one or more instruction sequences stored in an instruction memory 570. These elements are in communication with each other by means of a system bus 502. The display adapter 550 further includes a display memory 560 and a signal generator 565. In operation, the execution unit 555 converts decrypted information received from the system bus 502 and generates a presentable representation that it stores in the video memory 560. The signal generator 565 creates a video signal 551 according to the presentable representation stored in the video memory 560. This alternative embodiment further comprises a computer readable medium 525 (CRM) which is also in communication with other system elements by means of the system bus 502. One additional alternative embodiment further comprises a network interface 535 that enables communication with a network 530. The network interface 535 is also in communication with other system elements by means of the system bus 502. The network interface 535 according to various embodiments includes at least one of a computer network interface, a cable television distribution system interface and a broadcast satellite receiver interface.

This alterative example embodiment comprises various functional modules each of which comprises an instruction sequence that can be executed by the one or more processors 500 or by the execution unit 555 included in the display adapter 550. For purposes of this disclosure, a functional module and its corresponding instruction sequence is referred to by a process name. The instruction sequence that implements the process name, according to one alternative embodiment, is stored either in the memory 501 or the instruction memory 570. The reader is advised that the term "minimally causes the processor" and variants thereof is intended to serve as an open-ended enumeration of functions performed by the processor 500 (or the execution unit 555 in the display adapter 550) as it executes a particular functional process (i.e. instruction sequence). As such, an embodiment where a particular functional process causes the processor (or the execution unit 555 in the display adapter 550) to perform functions in addition to those defined in the appended claims is to be included in the scope of the claims appended hereto.

Stored in the memory are one or more instruction sequences including, but not limited to a reception manager 505 and an authorized player 510. The instruction sequences stored in the display adapter's 550 instruction memory 570 include, but are not limited to a capture module 575. In one alternative embodiment, the instruction memory 570 has stored therein a pixel shader module 590. In yet another alternative embodiment, the instruction memory 570 has stored therein a decode module 580.

According to yet another alternative embodiment, the system further comprises a capture utility module 520 stored in the memory 501. In yet another alternative embodiment, the system comprises an encode module 522. And, according to yet another alternative embodiment, the system further comprises an audio decompression module 515 stored in the memory 501 and an audio converter 600. The audio decompression module 515, when executed by the host processor 500, minimally causes the host processor 500 to convert a compressed audio content stream into a decompressed audio content stream. The decompressed audio content stream is directed to the audio converter 600, which converts a series of digital values included in the decompressed audio content stream into an audio presentation signal 605.

Figure 14:
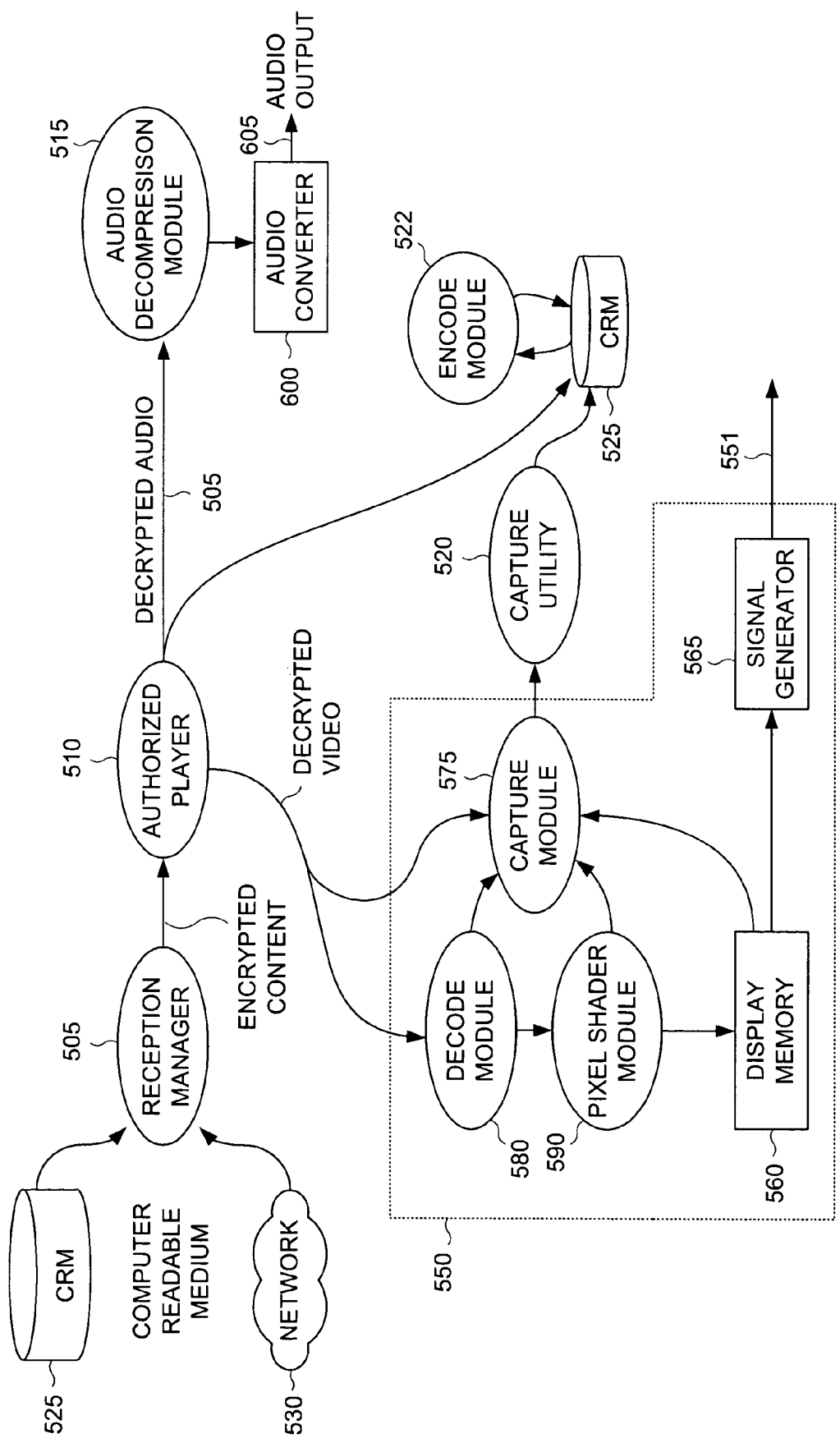
FIG. 14 is a data flow diagram that depicts the operation of one illustrative embodiment of a system for capturing decrypted information

FIG. 14 is a data flow diagram that depicts the operation of one illustrative embodiment of a system for capturing decrypted information. Encrypted information, according to this example embodiment, is received either from a computer readable medium 525 or from a network 530. The network 530, according to various illustrative use cases, includes, but is not necessarily limited to a computer network (e.g. the Internet), a cable television system distribution network and a direct broadcast satellite television distribution system. The reception manager 505 minimally causes the processor 500 to accept encrypted content and direct the encrypted content to the authorized player 510. It should be noted that the reception manager 505 can include various facilities provided by common operating systems, for example a file management and access system and a network communication protocol stack.

The authorized player 510, when executed by the processor 500, minimally causes the processor 500 to decrypt the encrypted information and direct the decrypted information to at least one of the display adapter 550 and an audio decompression module 515, also included in one alternative embodiment of a system for capturing decrypted information. When the decrypted information is received in the display adapter 550, the execution unit 555 captures the decrypted content by directing the content to the computer readable medium 525. The decrypted audio information is typically in a compressed form. Accordingly, the processor 500, as it executes the decompression module 515, minimally decompresses the audio information and directs the decompressed audio information to the audio converter 600 as a series of digital values. The audio converter 600 generates a presentation signal 605 according to series of digital values.

According to one alternative embodiment, the capture module 575, when executed by the execution unit 555, minimally causes the execution unit 555 to receive decrypted video content from the authorized player 510. According to one alternative example embodiment, the capture module 575 minimally causes the execution unit 555 to interact with the authorized player 510 in a manner wherein the authorized player 510 perceives the capture module 575 to be an authorized recipient of decrypted content. According to one alternative embodiment, this is accomplished by providing explicit certification to the authorized player 510. According to yet another alternative embodiment, this is accomplished by providing implicit certification to the authorized player (e.g. by emulating an authorized display adapter at a hardware level). The capture module 575 further minimally causes the execution unit 555 to direct the decrypted video content to the capture utility 520.

According to one example alternative embodiment, the capture module 575 captures decrypted video information in the form of a compressed content stream from at least one of the authorized player 510 or from the decode module 580. A compressed content stream, according to one alternative embodiment, is captured in a form that includes at least one of a display frame and an update frame. According to yet another alternative embodiment, the compressed content stream is captured in a format compatible with the MPEG standard. In either case, the capture module 575 further minimally causes the execution unit 555 to direct the compressed content stream to the capture utility 520. The capture utility 520, when executed by the processor 500, minimally causes the processor 500 to direct the compressed content stream to computer readable medium 525.

According to one alternative embodiment, the decode module 580, when executed by the execution unit 555, minimally causes the execution unit 555 to generate a presentable representation according to the decrypted video information and to direct the presentable representation to the pixel shader module 590. The pixel shader module 590, when executed by the execution unit 555, minimally causes the execution unit 555 to generate one or more pixels. According to one alternative embodiment, the capture module 575, when executed by the execution unit 555, minimally causes the execution unit 555 to receive the pixel data directly from the pixel shader module 590. According to yet another alternative embodiment, the capture module 575 minimally causes the execution unit 555 to receive the pixel data from the display memory 560 after the pixel shader module 590 causes the execution unit 555 to store one or more generated pixels therein. In either case, the capture module 575 further minimally causes the execution unit 555 to direct the pixel data to the capture utility 520.

According to one alternative example embodiment, the capture utility 520, when executed by the processor 500, minimally causes the processor 500 to direct the pixel data to the computer readable medium 525. According to one alternative embodiment, the processor 500 further executes the encode module 522. Accordingly, the encode module 522, when executed by the processor 500, minimally causes the processor 500 to retrieve pixel data from the computer readable medium 525, generate a compressed content stream according to the retrieved pixel data and then direct the compressed content stream back to the computer readable medium 525. In accordance with the teachings provided herein, the compressed content stream can be in a form that includes at least one of a display frame and an update frame. For example, according to one alternative embodiment of the encode module 522, the encode module 522 minimally causes the processor 500 to generate a compressed content stream that is compatible with the MPEG standard (e.g. MPEG I, MPEG II and MPEG IV).

The functional processes (and their corresponding instruction sequences) described thus far that enable the capture of decrypted information are, according to one alternative embodiment, imparted onto computer readable medium. Examples of such medium include, but are not limited to, random access memory, read-only memory (ROM), CD ROM, floppy disks, hard disk drives and magnetic tape.

Another example of a computer readable medium is a computer network. In this case, the computer network can be used to convey an instruction sequence to a computer. A computer network can include a serial data interface, a parallel data interface or a computer network such as an 802.11 interface. This enumeration of computer networks is intended to illustrate, but not limit the scope of the claims appended hereto. This computer readable medium, which alone or in combination can constitute a stand-alone product, can be used to convert at least one of a general-purpose computing platform and a display presentation device into a device for capturing decrypted information according to the techniques and teachings presented herein. Accordingly, the claims appended hereto are to include such computer readable medium imparted with such instruction sequences that enable execution of the present method and all of the teachings herein described.

While the present method, hardware, software and system have been described in terms of several alternative embodiments, it is contemplated that alternatives, modifications, permutations, and equivalents thereof will become apparent to those skilled in the art upon a reading of the specification and study of the drawings. It is therefore intended that the true spirit and scope of the appended claims include all such alternatives, modifications, permutations, and equivalents.

What is claimed is:

1. A method for capturing decrypted information directed to a presentation device, the method comprising:
   receiving, by the presentation device, decrypted information, wherein the device includes:
      a shader module containing a shader instruction sequence executable to apply a visual effect to each of one or more pixels comprising a presentable representation of the decrypted information and direct the one or more pixels to a display, and
      a capture module containing a capture instruction sequence executable to store at least one of the decrypted information or the one or more pixels with the applied visual effect in a first non-transitory computer readable storage medium;
   receiving, by the presentation device, an update to the capture instruction sequence, wherein the update includes instructions executable to monitor changes to the one or more pixels with the applied visual effect stored in the first non-transitory computer readable storage medium and direct the one or more pixels with the applied visual effect to a second non-transitory computer readable storage medium when changes to the one or more pixels occur;
   installing, by the presentation device, the update on the capture module, wherein installation of the update modifies at least a portion of the capture instruction sequence;
   executing, by the presentation device, the modified capture instruction sequence to: monitor changes to the one or more pixels with the applied visual effect stored in the first non-transitory computer readable storage medium and direct the one or more pixels with the applied visual effect to the second non-transitory computer readable storage medium when changes to the one or more pixels occur.

2. The method of claim 1, wherein receiving decrypted information comprises:
   providing a certification to a process; and
   receiving decrypted information from the process.

3. The method of claim 1, wherein receiving decrypted information comprises interacting with an executing process in a manner that implies certification.

4. The method of claim 1 wherein receiving decrypted information comprises receiving a presentable representation.

5. The method of claim 1 wherein receiving decrypted information comprises receiving a compressed content stream.

6. The method of claim 1, further comprising:
   retrieving, by the presentation device, the one or more pixels with the applied visual effect from the first non-transitory computer readable storage medium;
   encoding, by the presentation device, the one or more pixels with the applied visual effect in a compressed format; and
   storing, by the presentation device, the compressed format of the one or more pixels with the applied visual effect in the first non-transitory computer readable storage medium.

7. The method of claim 1, further comprising:
   converting, by the presentation device, the decrypted information into a compressed content stream; and
   storing, by the presentation device, the compressed content stream in the first non-transitory computer readable storage medium.

8. The method of claim 1, further comprising:
   storing, by the presentation device, at least one of a display frame and an update frame associated with the decrypted information in the first non-transitory computer readable storage medium.

9. A presentation device for capturing decrypted information comprising:
   a shader module containing a first shader instruction sequence executable to apply a visual effect to each of one or more pixels comprising a presentable representation of decrypted information directed to the presentation device and direct the one or more pixels with the applied visual effect to a display;
   a capture module containing a capture instruction sequence executable to store at least one of the decrypted information or the one or more pixels with the applied visual effect in a first non-transitory computer readable storage medium;
   an information port for receiving (i) the decrypted information directed to the presentation device and (ii) an update to the capture instruction sequence, wherein the update includes instructions executable to monitor changes to the one or more pixels with the applied visual effect stored in the first non-transitory computer readable storage medium and direct the one or more pixels with the applied visual effect to a second non-transitory computer readable storage medium when changes to the one or more pixels occur;
   an execution unit, containing a processor, for:
      installing the updated capture instruction sequence on the capture module, wherein installation of the update modifies at least a portion of the capture instruction sequence, and
      executing the modified capture instruction sequence to monitor changes to the one or more pixels with the applied visual effect stored in the first non-transitory computer readable storage medium and direct the one or more pixels with the applied visual effect to the second non-transitory computer readable storage medium when changes to the one or more pixels occur.

10. The presentation device of claim 9, wherein the information port is capable of providing an explicit certification to a host system.

11. The presentation device of claim 10, wherein the information port is capable of interacting with the host system in a manner that implies certification.

12. The presentation device of claim 9, wherein the information port is capable of receiving a presentable representation of decrypted information.

13. The presentation device of claim 9, wherein the information port is capable of receiving a compressed content stream of the decrypted information.

14. The presentation device of claim 9, further comprising a compression unit capable of:
   retrieving the one or more pixels with the applied visual effect from the first non-transitory computer readable storage medium;
   encoding the one or more pixels in a compressed content stream; and
   storing the compressed content stream in the first non-transitory computer readable storage medium.

15. The presentation device of claim 9, the executing further comprising:
   storing at least one of a display frame and an update frame associated with the decrypted information in the first non-transitory computer readable storage medium.

16. The presentation device of claim 9, the executing further comprising:
   converting the decrypted information into a compressed content stream; and
   storing the compressed content stream in the first non-transitory computer readable storage medium.

17. The presentation device of claim 9, the executing further comprising:
   storing at least one of a display frame and an update frame associated with the decrypted information in the first non-transitory computer readable storage medium.

18. A system for capturing decrypted information, the system comprising:
   a host processor;
   a first non-transitory computer readable storage medium in communication with the host processor;
   a second non-transitory computer readable storage medium in communication with the host processor;
   a display adapter in communication with the host processor that includes:
   a shader module containing a shader instruction sequence executable to apply a visual effect to each of one or more pixels comprising a presentable representation of the decrypted information and direct the one or more pixels to a display;
   a capture module containing a capture instruction sequence executable to store at least one of the decrypted information or the one or more pixels with the applied visual effect in the first non-transitory computer readable storage medium;
   a host port for receiving (i) decrypted information and (ii) an update to the capture instruction sequence, wherein the update includes instructions executable to monitor changes to the one or more pixels with the applied visual effect stored in the first non-transitory computer readable storage medium and direct the one or more pixels with the applied visual effect to the second non-transitory computer readable storage medium when changes to the one or more pixels occur;
   an instruction memory for storing the shader instruction sequence, the capture instruction sequence, and the update;
   an execution unit for:
      installing the update on the capture module, wherein installation of the update modifies at least a portion of the capture instruction sequence,
      executing the modified capture instruction sequence to monitor changes to the one or more pixels with the applied visual effect stored in the first non-transitory computer readable storage medium and direct the one or more pixels with the applied visual effect to the second non-transitory computer readable storage medium when changes to the one or more pixels occur; and
   an authorized player instruction sequence stored in the instruction memory that, when executed by the host processor, minimally causes the host processor to:
      retrieve the at least one of the decrypted information or the one or more pixels with the applied visual effect from the first non-transitory computer readable storage medium; and
      direct the at least one of the decrypted information or the one or more pixels with the applied visual effect to the display adapter.

19. The system of claim 18, wherein the execution unit provides at least one of an explicit certification and an implicit certification to the authorized player instruction sequence.

20. The system of claim 18, the executing further comprising:
   converting the decrypted information into a compressed content stream; and
   storing the compressed content stream in the first non-transitory computer readable storage medium.

21. The system of claim 18, the executing further comprising:
   storing at least one of a display frame and an update frame associated with the decrypted information in the first non-transitory computer readable storage medium.

22. A computer program product, tangibly embodied in a non-transitory computer-readable storage medium, for capturing decrypted information, the computer program product including instructions being operable to cause a data processing apparatus to:
   receive decrypted information directed to a presentation device, wherein the device includes:
      a shader module containing a shader instruction sequence executable to apply a visual effect to each of one or more pixels comprising a presentable representation of the decrypted information and direct the one or more pixels to a display, and
      a capture module containing a capture instruction sequence executable to store at least one of the decrypted information or the one or more pixels with the applied visual effect in a first non-transitory computer readable storage medium;
   receive an update to the capture instruction sequence, wherein the update includes instructions executable to monitor changes to the one or more pixels with the applied visual effect stored in the first non-transitory computer readable storage medium and direct the one or more pixels with the applied visual effect to a second non-transitory computer readable storage medium when changes to the one or more pixels occur;
   install the update on the capture module, wherein installation of the update modifies at least a portion of the capture instruction sequence; and execute the modified capture instruction sequence to monitor changes to the one or more pixels with the applied visual effect stored in the first non-transitory computer readable storage medium and direct the one or more pixels with the applied visual effect to the second non-transitory computer readable storage medium when changes to the one or more pixels occur.

23. A system for capturing decrypted information, the system comprising:
- means for receiving decrypted information directed to a presentation device, wherein the device includes:
  - a shader module containing a shader instruction sequence executable to apply a visual effect to one or more pixels comprising a presentable representation of the decrypted information and direct the one or more pixels with the applied visual effect to a display, and
  - a capture module containing a capture instruction sequence executable to store at least one of the decrypted information or the one or more pixels with the applied visual effect in a first non-transitory computer readable storage medium;
- means for receiving an update to the capture instruction sequence, wherein the update includes instructions executable to monitor changes to the one or more pixels with the applied visual effect stored in the first non-transitory computer readable storage medium and direct the one or more pixels with the applied visual effect to a second non-transitory computer readable storage medium when changes to the one or more pixels occur;
- means for installing the update on the capture module, wherein installation of the update modifies at least a portion of the capture instruction sequence; and
- means for executing the modified capture instruction sequence to monitor changes to the one or more pixels with the applied visual effect stored in the first non-transitory computer readable storage medium and direct the one or more pixels with the applied visual effect to the second non-transitory computer readable storage medium when changes to the one or more pixels occur.

24. A method for capturing decrypted information directed to a graphics processing unit of a presentation device, the method comprising:
- receiving, by the graphics processing unit, decrypted information, wherein the graphics processing unit includes:
  - a shader module containing a first instruction sequence executable to apply a visual effect to one or more pixels comprising a presentable representation of the decrypted information and direct the one or more pixels with the applied visual effect to a display, and
  - a capture module containing a capture instruction sequence executable to store at least one of the decrypted information or the one or more pixels with the applied visual effect in a video RAM;
- receiving, by the graphics processing unit, an update to the capture instruction sequence, wherein the update includes instructions executable to monitor changes to the one or more pixels with the applied visual effect stored in the video RAM and direct the one or more pixels with the applied visual effect to an information port when changes to the one or more pixels occur;
- installing, by the graphics processing unit, the update on the capture module, wherein installation of the update shader instruction sequence modifies at least a portion of the capture instruction sequence;
- executing, by the graphics processing unit, the shader instruction sequence to apply a visual effect to the one or more pixels;
- directing, by the graphics processing unit, the one or pixels with the applied visual effect to the video RAM; and
- executing, by the graphics processing unit, the modified capture instruction sequence to monitor changes to the one or more pixels with the applied visual effect stored in the video RAM and direct the one or more pixels with the applied visual effect to the information port connected to a system bus for storage in a non-transitory computer readable storage medium when changes to the one or more pixels occur.

25. The method of claim 1, wherein the presentation device comprises a graphics processing unit located on a graphics adapter.

* * * * *